United States Patent
Paquette et al.

(10) Patent No.: US 7,657,686 B2
(45) Date of Patent: Feb. 2, 2010

(54) METHOD AND APPARATUS FOR FRAME BUFFER MANAGEMENT

(75) Inventors: Michael James Paquette, Benicia, CA (US); Simon Douglas, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 25 days.

(21) Appl. No.: 11/644,154

(22) Filed: Dec. 21, 2006

(65) Prior Publication Data

US 2007/0103477 A1    May 10, 2007

Related U.S. Application Data

(60) Continuation of application No. 11/371,552, filed on Mar. 8, 2006, now Pat. No. 7,330,922, which is a division of application No. 10/455,273, filed on Jun. 4, 2003, now Pat. No. 7,019,752.

(51) Int. Cl.
*H05K 7/10* (2006.01)
*G06F 13/00* (2006.01)
*G09G 5/36* (2006.01)

(52) U.S. Cl. .................. 710/302; 345/536; 345/545

(58) Field of Classification Search ................ 345/543, 345/545, 530, 1.1, 2.1, 531, 536, 501; 710/1, 710/2, 302, 301, 300, 100; 711/203
See application file for complete search history.

(56) References Cited

U.S. PATENT DOCUMENTS

| | | | |
|---|---|---|---|
| 5,210,855 A | 5/1993 | Bartol | |
| 5,519,825 A | 5/1996 | Naughton et al. | |
| 5,900,885 A | 5/1999 | Stortz | |
| 6,070,207 A | 5/2000 | Bell | |
| 6,100,906 A | 8/2000 | Asaro et al. | |
| 6,125,437 A | 9/2000 | Buck-Gengler | |
| 6,184,908 B1 | 2/2001 | Chan et al. | |
| 6,226,732 B1 * | 5/2001 | Pei et al. ..................... | 711/207 |
| 6,266,753 B1 | 7/2001 | Hicok et al. | |
| 6,304,297 B1 | 10/2001 | Swan | |
| 6,628,244 B1 | 9/2003 | Hirosawa et al. | |
| 6,906,720 B2 * | 6/2005 | Emberling et al. .......... | 345/531 |
| 2003/0167367 A1 | 9/2003 | Kaushik et al. | |

* cited by examiner

*Primary Examiner*—Joni Hsu
(74) *Attorney, Agent, or Firm*—Blakely, Sokoloff, Taylor & Zafman LLP

(57) ABSTRACT

Methods and apparatuses for dynamic virtual frame buffer management. At least one embodiment of the present invention dynamically enables or disables the use of a virtual frame buffer, which is not under control of graphics hardware of a data processing system, without restarting the graphical user interface system (e.g., the window system) of the data processing system. For example, in response to the addition or removing of a frame buffer that is under control of a graphics controller (e.g., due to the activation or deactivation of the graphics controller, or the hot plug-in or hot disconnection of the graphics controller), the virtual frame buffer is disabled or enabled respectively.

60 Claims, 9 Drawing Sheets

METHOD AND APPARATUS FOR FRAME BUFFER MANAGEMENT

This application is a continuation of U.S. patent application Ser. No. 11/371,552, filed on Mar. 8, 2006 now U.S. Pat. No. 7,330,922, which is a divisional application of U.S. patent application Ser. No. 10/455,273, filed on Jun. 4, 2003, now issued as U.S. Pat. No. 7,019,752.

FIELD OF THE INVENTION

The invention relates to display systems, and more particularly to the management of frame buffers of data processing systems.

BACKGROUND

In some operating systems (e.g., version 9 of Mac OS from Apple Computer, Inc.), application programs (e.g., a web browser, a word processing software program, a game software program, or others) can assume that there is at least one frame buffer available for drawing their graphical user interfaces. A frame buffer is typically under control of a graphics controller (display controller), which controls a display device according to the information stored on the frame buffer. For example, a typical frame buffer is on the video memory on a graphics card. It is understood that drawing graphical user interfaces on a frame buffer refers to defining display information (e.g., in terms of RGB color values for a color display), typically pixel by pixel, for the display of the graphical user interfaces. The display controller uses the contents of the frame buffer to generate control signals for refreshing the screen of a display device (e.g., a Cathode Ray Tube (CRT) monitor, or a Liquid Crystal Display (LCD) panel).

Some computers may not have a graphics controller and a display device. During the start up time of such a computer that has no graphics controllers, the operating system allocates a virtual frame buffer, using a portion of the system memory of the computer, to provide a place for the application programs to draw their user interfaces. The virtual frame buffer is not associated with or controlled by a particular graphics controller. The virtual frame buffer allows the application programs to generate the display information about their graphical user interfaces properly, even when the computer does not have directly attached graphics controllers and display devices. The content of the virtual frame buffer is not used for the generation of control signals for a display device that is directly attached to this computer.

SUMMARY OF THE DESCRIPTION

Methods and apparatuses for dynamic virtual frame buffer management are described here. Some of the embodiments of the present invention are summarized in this section.

At least one embodiment of the present invention dynamically enables or disables the use of a virtual frame buffer, which is not under control of graphics hardware of a data processing system, without restarting the graphical user interface system (e.g., the window system, or the entire operating system) of the data processing system. For example, in response to the addition or removing of a frame buffer that is under control of a graphics controller (e.g., due to the activation or deactivation of the graphics controller, or the hot plug-in or hot disconnection of the graphics controller), the virtual frame buffer is disabled or enabled respectively.

In one aspect of the present invention, a method of display buffer management on a data processing system includes: determining a first determination to disable a virtual frame buffer, where the virtual frame buffer is not controlled by any display controller of the data processing system and where one or more application processes running on the data processing system draw one or more user interfaces on the virtual frame buffer; and, disabling the virtual frame buffer in response to the first determination, where, after the virtual frame buffer is disabled, the one or more application processes draw the one or more user interfaces on a first frame buffer under control of a display controller, without a graphical system of the data processing system being restarted. In one example, the first determination is in response to the detection of a hot plug-in of a display component into the data processing system. In one example, the virtual frame buffer includes memory allocated from random access memory of the data processing system; and, disabling the virtual frame buffer includes freeing the memory allocated from the random access memory of the data processing system. In one example, the display component includes the display controller; and, the first frame buffer under control of the display controller is activated in response to the hot plug-in. In one example, the display component includes a display device, which is controlled by the display controller after the hot plug-in; and, in response to the hot plug-in, the display controller is activated to control the display device and the first frame buffer; and, the first frame buffer is also activated so that the one or more application processes draw the one or more user interfaces on the first frame buffer. In one example, the hot plug-in includes turning on a power supply to the display component which has an established wire connection between the display component and the data processing system. In another example, the hot plug-in includes establishing a wire connection between the display component and the data processing system while both the display component and the data processing system are energized with power.

In another aspect of the present invention, a method of display buffer management on a data processing system includes: determining a first determination to enable a virtual frame buffer, where one or more application processes running on the data processing system draw one or more user interfaces on a first frame buffer under control of a display controller; and enabling the virtual frame buffer in response to the first determination without a graphical system of the data processing system being restarted, where the virtual frame buffer is not controlled by any display controller of the data processing system; and where, after the virtual frame buffer is enabled, the one or more application processes draw the one or more user interfaces on the virtual frame buffer. In one example, the first determination is in response to the detection of a hot disconnection of a display component from the data processing system. In one example, the virtual frame buffer includes memory allocated from random access memory of the data processing system; and, enabling the virtual frame buffer includes dynamically allocating the memory for the virtual frame buffer from the random access memory of the data processing system. In one example, the display component that is hot disconnected includes the display controller. In one example, the display component includes a display device, which is controlled by the display controller before the hot disconnection. In one example, the first frame buffer is disabled in response to the hot disconnection; and the display controller is deactivated in response to the hot disconnection. In one example, the hot disconnection includes turning off a power supply to the display component without breaking an established wire connection between the display component and the data processing system. In another example, the hot disconnection includes breaking a wire connection between the display component and the data processing system while both the display component and the data processing system are energized with power.

In a further aspect of the present invention, a method of frame buffer management on a data processing system, includes: enabling a first frame buffer on the data processing system; and enabling a virtual frame buffer on the data processing system without terminating the first application process; where: a first application process draws a first user interface on the first frame buffer; a second application process draws a second user interface on the virtual frame buffer, which is not controlled by any display controller of the data processing system; and, the first and second application processes are executed in one processor of the data processing system. In one example, the first frame buffer is a virtual frame buffer, which is not under control of any display controller of the data processing system. In another example, the first frame buffer is under control of a display controller of the data processing system; the first frame buffer is disabled in response to a deactivation of the display controller, which is in response to a deactivation of a display device controlled by the display controller in one example; and the first application process continues to draw the first user interface on the virtual frame buffer after the virtual frame buffer is enabled and the first frame buffer is disabled. In one example, the first frame buffer is again enabled in response to an activation of the display controller after the first frame buffer is disabled; and then, the virtual frame buffer is disabled without terminating the second application process. The second application process continues to draw the second user interface on the first frame buffer after the virtual frame buffer is disabled. In another example, the first application process continues to draw the first user interface on the first frame buffer after the virtual frame buffer is enabled. In a further example, contents on the virtual frame buffer are provided through a network for remote access; and, the virtual frame buffer is disabled upon a termination of the remote access.

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessary to the same embodiment; and, such references means at least one.

Traditionally, whether or not to use a virtual frame buffer is determined in the start up process of a computer. In the traditional approach, if the computer uses a virtual frame buffer, it is necessary to restart the computer or to restart the graphical user interface system (e.g., an X window server), after a configuration change (e.g., after the addition of a graphics card), to stop the use of the virtual frame buffer and to use a frame buffer that is under control of a graphics controller (display controller); similarly, if the computer uses a frame buffer that is under control of a display controller, it is necessary in the traditional approach to restart the computer or a portion of the operating system (e.g., the window system), after a hardware configuration change (e.g., after the removal of the display controller), to enable the use of a virtual frame buffer. Typically, the operation of adding or removing a graphics card was performed after turning off the power to the computer.

At least one embodiment of the present invention seeks to dynamically enable or disable the use of a virtual frame buffer. In one embodiment of the present invention, when a display component (e.g., a display device, or an external display controller) is hot plugged into or removed from a computer system, the use of a virtual frame buffer is dynamically disabled or enabled without having to restart the graphical system of the computer system. In one embodiment of the present invention, the use of a virtual frame buffer is enabled when all hardware displays (directly attached display devices) become unavailable (e.g., turned off or disconnected); and, the use of the virtual frame buffer is disabled when at least one hardware display becomes available (e.g., turned on). In one embodiment of the present invention, the virtual frame buffer appears to the application programs as just another display controller (e.g., through the use of a device driver that operates virtual frame buffers), requiring no special application support.

Figure 1:
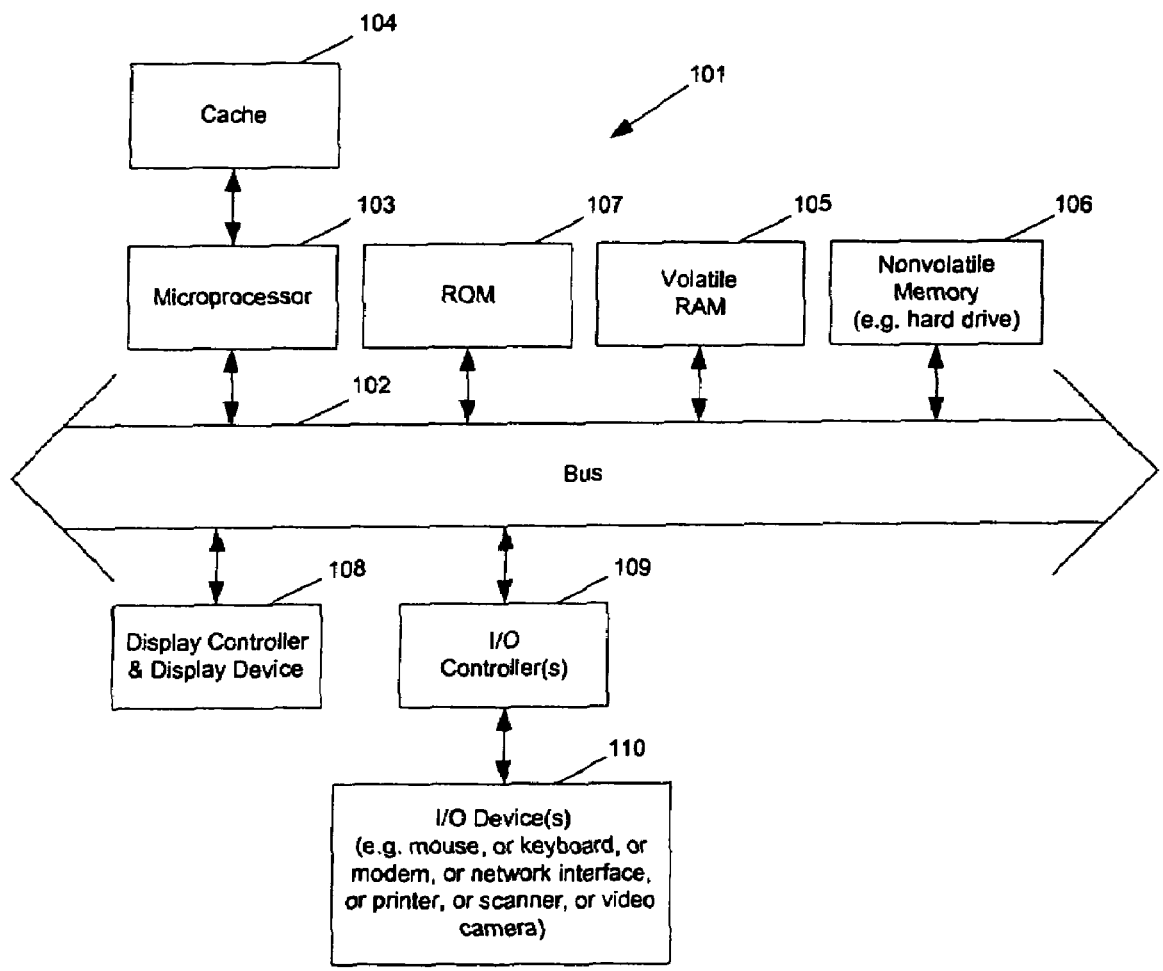
FIG. 1 shows a block diagram example of a data processing system which may be used with the present invention.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems (e.g., a palm top device, or a cellular phone, or other) which have fewer components or perhaps more components may also be used with the present invention. The computer system of FIG. 1 may, for example, be an Apple Titanium PowerBook computer, an Apple iBook computer, or others.

As shown in FIG. 1, the computer system 101, which is a form of a data processing system, includes a bus 102 which is coupled to a microprocessor 103 and a ROM 107 and volatile RAM 105 and a non-volatile memory 106. The microprocessor 103, which may be, for example, a G3 or G4 microprocessor from Motorola, Inc. or IBM is coupled to cache memory 104 as shown in the example of FIG. 1. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. The display controller typically has its own processor (e.g., a Graphics Processing Unit (GPU)) and a memory controller and memory (e.g., including a frame buffer) which is separate from and in addition to the microprocessor 103 and the memory 105. The memory controller of the display controller controls the memory of the display controller; and, the system 101 includes a memory controller which controls (e.g., refreshes) the memory 105 of the system 101. Typically, the memory in the system memory (e.g., RAM 105) of the computer is in a separate physical memory space than the memory in the display controller. For example, the system memory (e.g., including RAM 105) of system 101 is in a first predetermined physical memory space under control of a system memory controller and the memory on display controller 108 is in a second predetermined physical memory space under control of a memory controller of the display controller, where the first and second predetermined physical memory spaces may have overlapping (e.g., a same physical address that can be used in the first memory space for accessing the RAM through the system memory controller and in the second memory space for accessing the display controller through the memory controller of the display controller). Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 1. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

In one embodiment of the present invention, display controller and display device 108 can be hot plugged into or removed from the system in FIG. 1. For example, the display device can be a plug-and-play monitor so that when the display device is hot plugged into the running system (e.g., by switching on the power to the display device that is already connected to the display controller, or by establishing the connection between the display controller and the display device while both the display controller and the display device are energized with power), the display controller is activated; when the display device is hot disconnected from the running system (e.g., by switching off the power to the display device that is connected to the display controller, or by breaking the connection between the display controller and the display device while both the display controller and the display device are energized with power), the display controller is deactivated. Further, the display controller can be a plug-and-play device. For example, the display controller is an external device that can be hot connected to the running system through a communication port (e.g., a PCMCIA slot, a USB port, or an IEEE-1394 bus connection). Thus, the number of active display controllers on the system can change to or from zero due to hot plug-in or hot disconnection of a display component (e.g., a graphics card or video card, or a display device). In one embodiment of the present invention, when the number of active display controllers on a computer changes to or from zero, the use of a virtual frame buffer is enabled or disabled automatically without having to restart the graphical user interface system (e.g., the window system) of the computer. Further, in one embodiment, the operating system performs the switching between the use of a virtual frame buffer and the use of a frame buffer under control of a display controller (e.g., through the automatic switching of device drivers) so that no interruption and no apparent changes appear to the application programs.

In one embodiment of the present invention, server computers can operate without a display device fixedly attached to them. A keyboard-video-mouse switch can be used to dynamically attach or detach a set of keyboard, monitor and mouse to or from a server so that a system administrator can use the same set of keyboard, monitor and mouse to selectively control one of a number of server computers. The switching between the use of a virtual frame buffer and the use of a frame buffer that is under control of a display controller is performed on the fly so that the applications running on the server can be used without interruption. Further, contents of the virtual frame buffer and the frame buffer that is under control of the display controller can be accessed by a remote client computer without distinction so that there is no disruption in the remote access due to the dynamic switching to or from the use of the virtual frame buffer.

Figure 2:
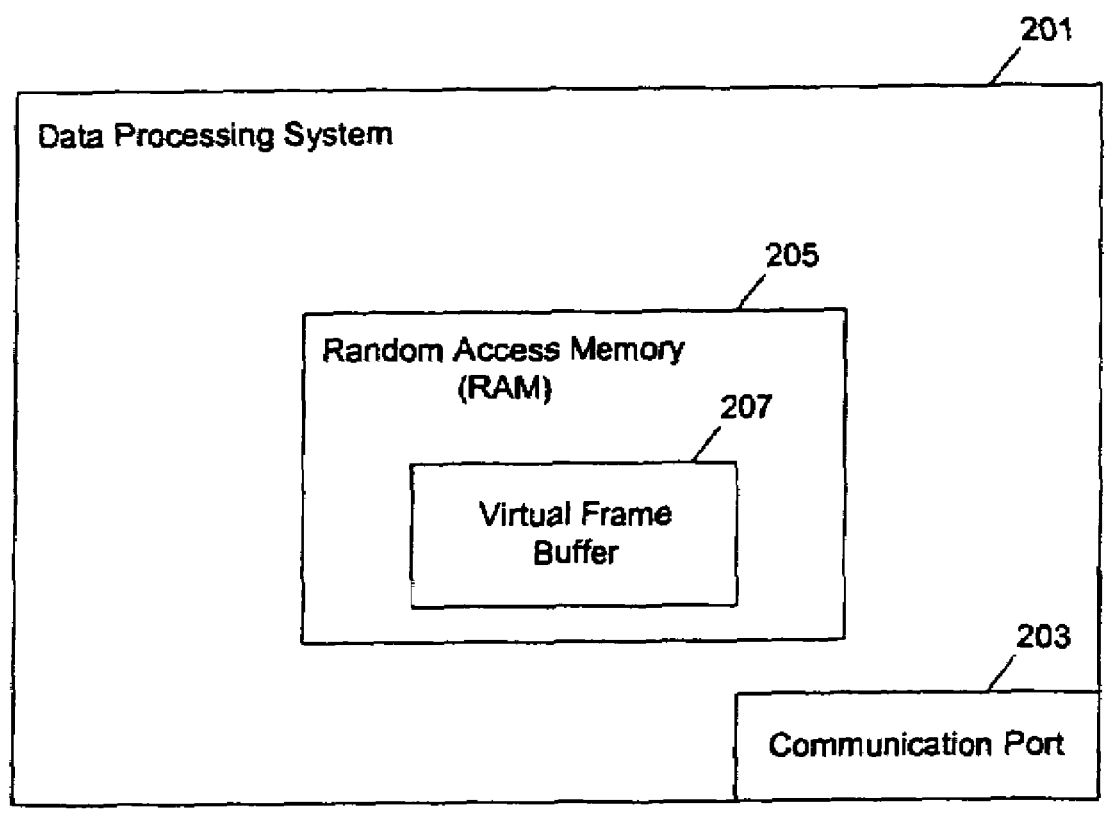
FIGS. 2-4 illustrate a scenario of using virtual frame buffers according to one embodiment of the present invention.
Figure 3:
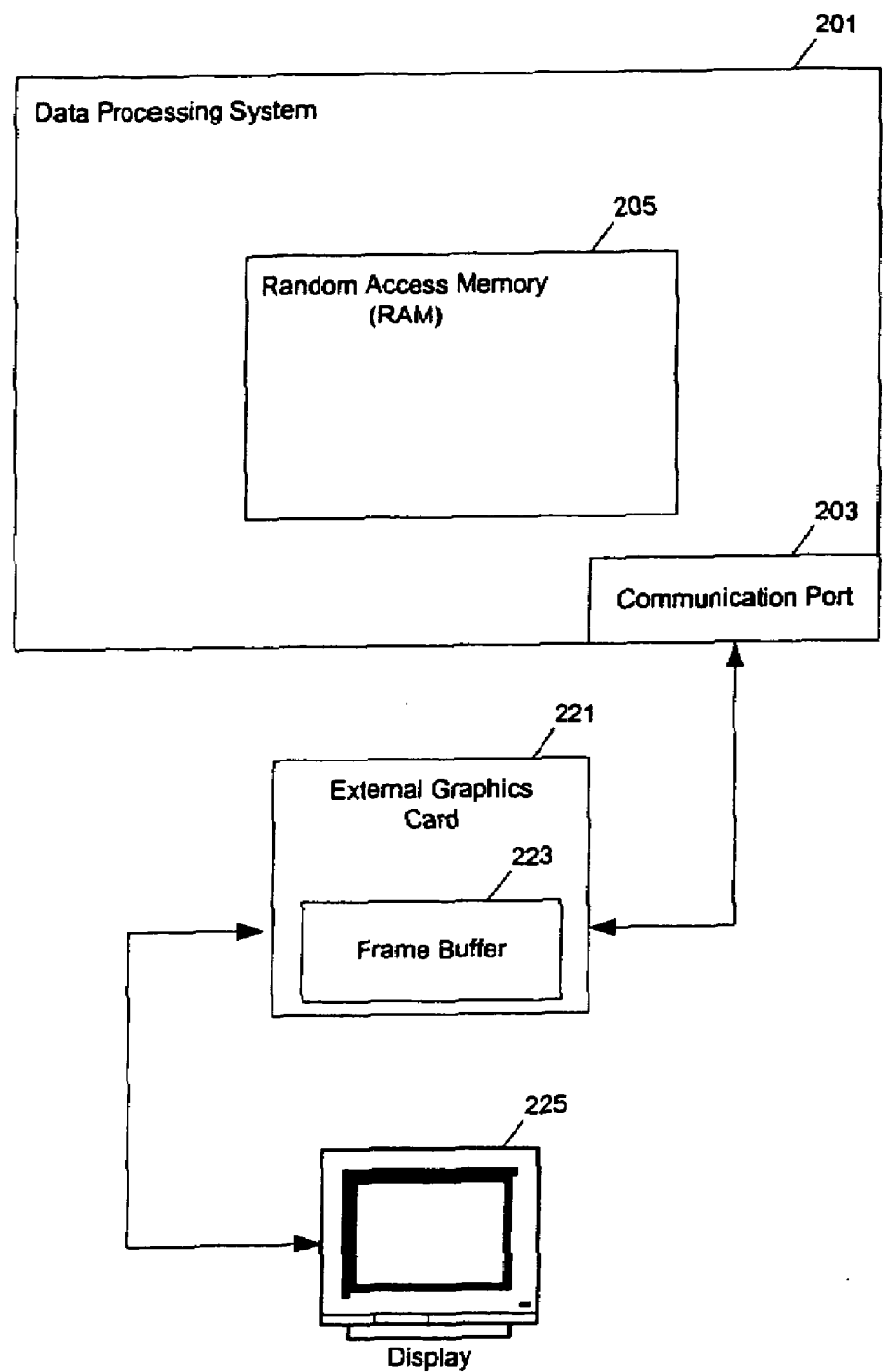
Figure 4:
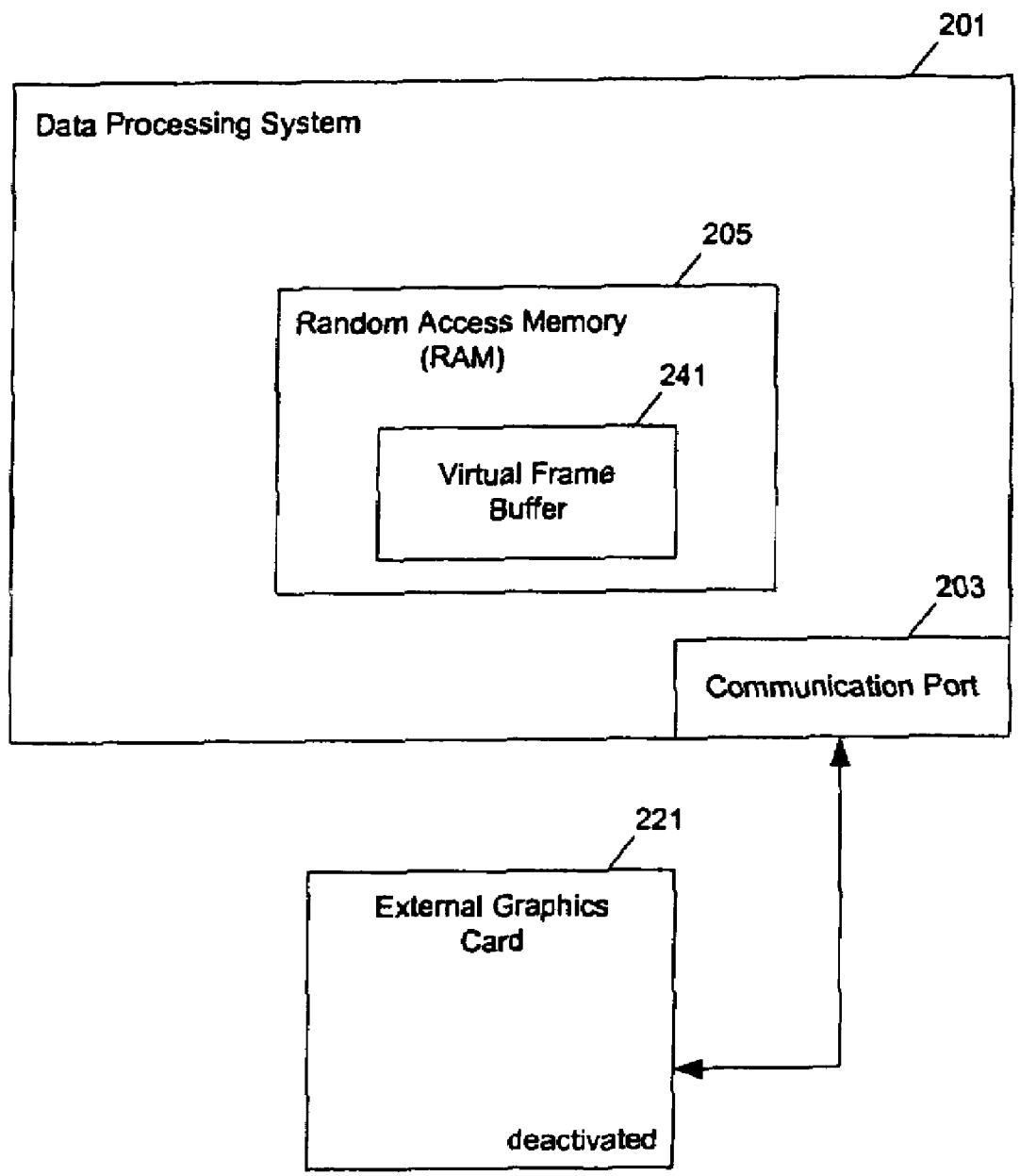

FIGS. 2-4 illustrate a scenario of using virtual frame buffers according to one embodiment of the present invention. In one embodiment of the present invention, data processing system 201 of FIG. 2 can operate without an active display controller (active graphics card or video card). Note that data processing system 201 can have various other components (e.g., those shown in FIG. 1) that are not explicitly shown in FIG. 2. A portion of Random Access Memory (RAM) 205 of the data processing system is allocated as virtual frame buffer 207, onto which application processes draw their graphical user interfaces. The content of the virtual frame buffer may be accessed for a remote client through a network connection (not shown in FIG. 2); and, system 201 can be a server over a computer network. Communication port 203 (e.g., a PCM-CIA slot, a USB port, an IEEE-1394 bus connector, or others) allows a user to attach a display controller to system 201 dynamically, without having to shut down or restart system 201. FIG. 3 shows a situation when external graphics card 221 is attached to communication port 203. Display device 225 is attached to the external graphics card. Thus, after system 201 gains an active graphics controller (221), frame buffer 223 in the graphics card is used for the application processes to draw their user interfaces. A user interface provides one or more ways of allowing a user (e.g., a human) to interact with a machine. There are varieties of such ways, including text based systems (e.g., MS-DOS) or graphical systems. The user, through any one of these ways, can provide input to an application which can then result in a display of data through a frame buffer. A user interface may, for example, of an application process include a window that occupies a portion of the display screen (and a portion of the frame buffer). The window of the user interface may include graphical user interface elements (e.g., buttons, icons, text areas, menus, docks, palettes) or a text-based user interface (e.g., a command line interface in a terminal window). The window may display a picture or a video clip. The window may or may not have a border (e.g., a title bar). Alternatively, the user interface may occupy the entire screen (e.g., for a user interface of a video game, or for a graphical desktop environment). A user interface of the application process communicates a state of the application process to a user through a graphical system of a data processing system (e.g., using text messages and/or graphical representations). In one embodiment of the present invention, after frame buffer 223 is activated, virtual frame buffer (207) is disabled; and, the allocated memory for the virtual frame buffer is freed so that the memory can be used for other purposes. In one embodiment of the present invention, at least a portion of the content in the virtual frame buffer is copied into the frame buffer 223 (e.g., before the memory of the virtual frame buffer is freed). In one embodiment of the present invention, application processes that draw their user interfaces on the virtual frame buffer are informed to redraw on the frame buffer 223 (e.g., after the content on virtual frame buffer 207 is copied onto frame buffer 223, or without copying from virtual frame buffer 207 to frame buffer 223). In one embodiment of the present invention, the operating system remaps the destination of the drawing operation (e.g., through dynamically switching the device drivers) so that it appears to the application processes that there were no changes in the switching of the frame buffers; thus, no special supports from the application processes are necessary to facilitate the switching; and it is not necessary to terminate or restart the application processes.

FIG. 4 shows a situation when display device 225 is disconnected from graphics card 221. In one embodiment of the present invention, upon the detection of the disconnection of the display device, external graphics card 221 is deactivated. To provide a place for the application processes that were using frame buffer 223 to draw their user interfaces, a software driver for virtual frame buffer is activated to allocate memory from random access memory 205 to form virtual frame buffer 241. Thus, the application processes continue to draw their user interfaces on virtual frame buffer 241, instead of on frame buffer 223 that was under control of graphics card 221. In one embodiment of the present invention, the operating system dynamically switches the device driver so that the application processes do not have to support (or notice the change in frame buffers). In one embodiment of the present invention, the contents on frame buffer 223 are copied onto virtual frame buffer 241 during the switching, before the application processes are informed to redraw.

FIG. 4 shows a situation where the wire connection between the display device and the graphics card is broken while the system is running. In one embodiment of the present invention, the graphics card is deactivated, when the display device (225) is simply turned off (without having to break the wire connection). Thus, in such an embodiment, when display device 225 is turned off while display device 225 and graphics card 221 are still physically connected, the graphics card is deactivated and the virtual frame buffer is used; when display device 225 is turned on, the graphics card is activated and the frame buffer 223 is used.

Typically, read access to RAM 205 is much faster than read access to frame buffer (e.g., 223) that is under control of a graphics card. When there is no active display device attached to the graphics card, the content of the corresponding buffer is likely to be accessed for remote display. Thus, using a virtual frame buffer can improve the performance for remote access. Further, deactivating the graphics card can decrease the overall power consumption. However, using a portion of the random access memory as the virtual frame buffer may increase the CPU usage, since certain hardware acceleration offered by a graphics card (e.g., a graphics processing unit (GPU)) becomes unavailable; and, certain drawing operations can be slower when the virtual frame buffer is used. In one embodiment of the present invention, system preferences can be used to determine whether the graphics card should be deactivated upon the detection that the display device is disconnected from the graphics card (or becomes inactive). Further, the switching between the use of the virtual frame buffer and the use of the frame buffer in the graphics card can be initiated by determinations related to power consumption, CPU usage, and others. Thus, the switching to or from the use of a virtual frame buffer can further be used to improve the overall system performance. Further, it is understood that, in some circumstances, it can be desirable to use both the frame buffer and the virtual frame buffer.

Figure 5:
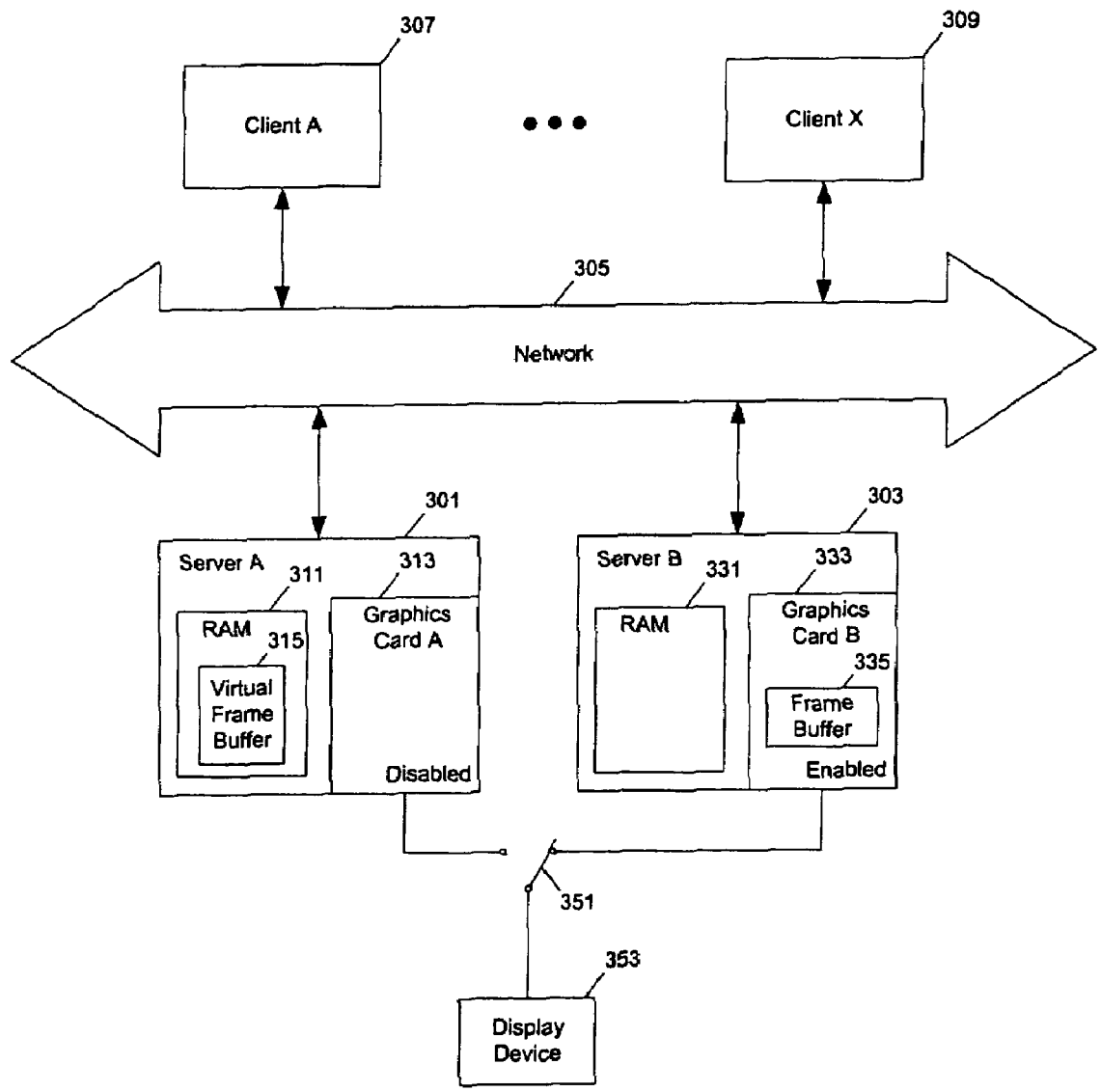
FIGS. 5-6 illustrate another scenario of using virtual frame buffers according to one embodiment of the present invention.
Figure 6:
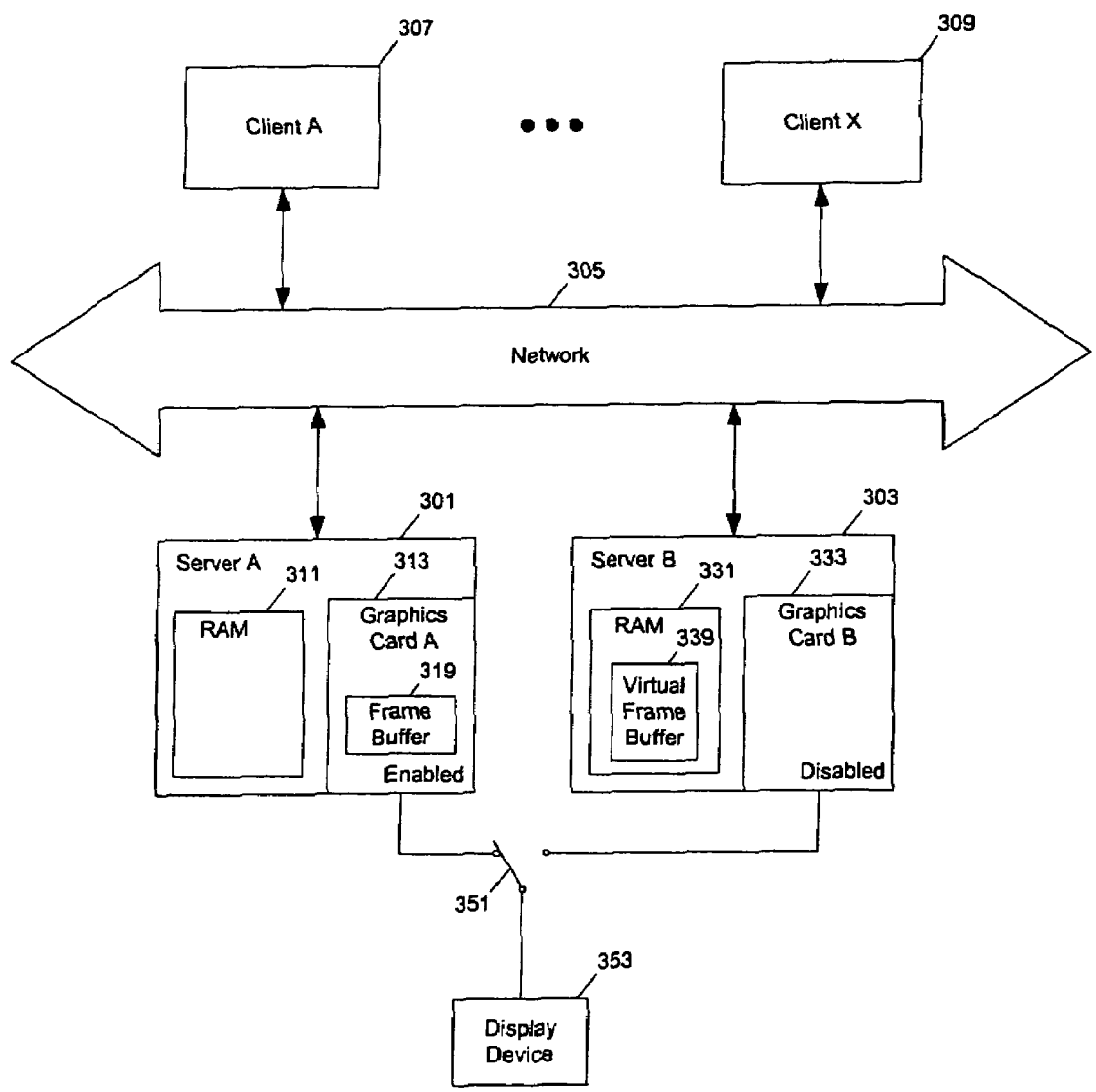

FIGS. 5-6 illustrate another scenario of using virtual frame buffers according to one embodiment of the present invention. Servers 301 and 303 provide services to clients (e.g., computers 307 and 309) through network 305 (e.g., a local area network, an intranet, the Internet). Each of servers 301 and 303 has an installed graphics card (e.g., cards 313 and 333). However, the servers do not normally need a display device. An administrator may occasionally need direct access to one of the servers. Thus, display device 353 can be selectively coupled to one of the servers through switch 351 (e.g., a keyboard-video-mouse switch). In FIG. 5, display device 353 is attached to graphics card 333 of server 303. Server 303 uses frame buffer 335 of graphics card 333 for the drawing of graphical user interfaces, which is displayed on display device 353 and can be remotely accessed by a client computer (e.g., computer 307) through network 305. Since the graphics user interfaces are drawn on frame buffer 335 of graphics card 333, no memory in RAM 331 is allocated as a virtual frame buffer; and, server 303 does not use a virtual frame buffer in the example of FIG. 5. However, in FIG. 5, graphics card 313 of server 301 is not connected to an active display device. Thus, graphics card 313 of server 301 is disabled; and, a portion of RAM 311 is allocated as virtual frame buffer 315. In server 301, application processes draw graphical user interfaces on virtual frame buffer 315, which is not under control of any graphics hardware.

When the system administrator turns switch 351 to attach display device 353 to server 301 and to detach display device 353 from server 303, the switching between the use of virtual frame buffer and the use of frame buffer in the graphics hardware occurs automatically, without restarting the servers or terminating the application processes that are running on the servers.

FIG. 6 shows the situation where the display device is attached to server 301 after the switching. Virtual frame buffer 315 (shown in FIG. 5) is freed; and graphics card 313 of server 301 is activated. The application processes running on the server 301 continue to draw their graphics user interfaces on frame buffer 319 of graphics card 313. Graphics card 313 generates control signals according to the content of frame buffer 319 to cause display device 353 to show the corresponding information (e.g., cursors, icons, windows, animations, movies) that is drawn on frame buffer 319. Note the information on frame buffer 319 can also be read and transferred to a remote client for display (e.g., through software tools, such as Apple Remote Desktop or Timbuktu). Since graphics card 333 of server 303 is not connected to any active display device, graphics card 333 is disabled (e.g., deactivated to conserver power). A portion of RAM 331 is allocated as virtual frame buffer 339 so that the application processes that used frame buffer 335 of graphics card 333 continue to use the virtual frame buffer to draw their user interfaces. Thus, the application processes running on server 303 have at least one place to draw their user interfaces; and, the switching to the use of virtual frame buffer 339 does not cause the termination of these application processes that were using frame buffer 335 (shown in FIG. 5) to draw their user interfaces. In one embodiment of the present invention, a software device driver for a virtual frame buffer imitates the device driver of graphics card 333 so that there appear no differences to the applications programs in using either the virtual frame buffer or the frame buffer 335. The information on virtual frame buffer 339 can also be read and transferred to a remote client for display.

FIGS. 5-6 show the situation of sharing a display device among a number of server computers. Further, the server computers can share one graphics card. For example, an external plug-and-play video card connected to a display device can be dynamically attached to one of the server computers to allow the dynamic local access to the user interfaces running on the servers. When the external video card is attached to a server, the server stops using the virtual frame buffer and starts to use the frame buffer in the video card. Alternatively, the server may continue to maintain the virtual frame buffer, while also using the frame buffer in the video card (e.g., through replicating contents between the frame buffers, or, as different screens for drawing), when available.

Figure 7:
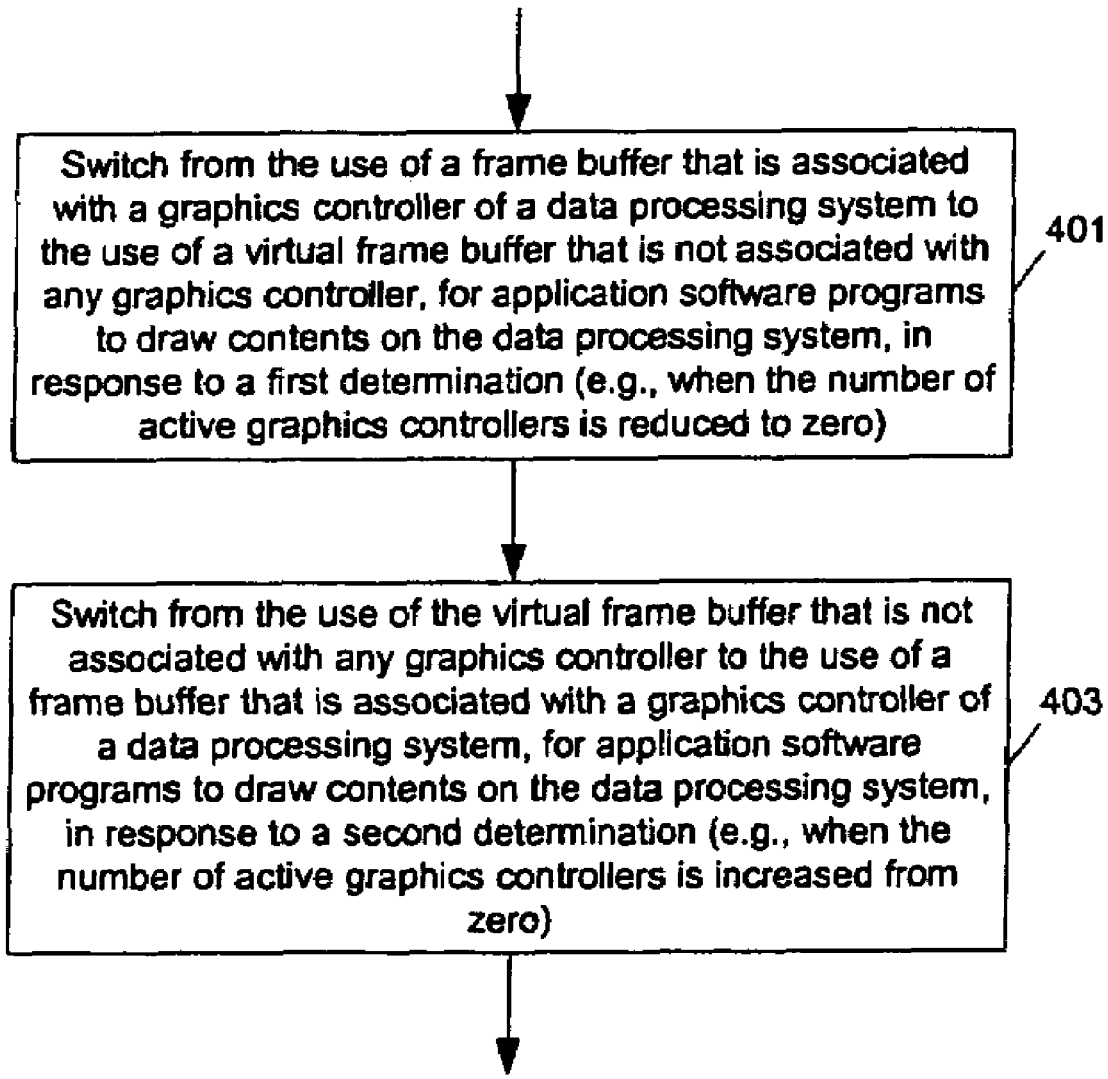
FIG. 7 shows a method to operate a virtual frame buffer according to one embodiment of the present invention.

FIG. 7 shows a method to operate a virtual frame buffer according to one embodiment of the present invention. After the start up process of a data processing system and before the data processing system is restarted, operation 401 switches from the use of a frame buffer that is associated with a graphics controller of the data processing system to the use of a virtual frame buffer that is not associated with any graphics controller, for application software programs to draw contents on the data processing system, in response to a first determination (e.g., when the number of active graphics controllers is reduced to zero). For example, the switching does not require the termination (or restart) of the application processes that were using the frame buffer that was associated with the graphics controller. The graphics controller, sometimes called display controller, may be in a graphics card or a video card, which may be a removable device. Similarly, without restarting the data processing system, operation 403 switches from the use of the virtual frame buffer that is not associated with any graphics controller to the use of a frame buffer that is associated with a graphics controller of a data processing system, for application software programs to draw contents on the data processing system, in response to a second determination (e.g., when the number of active graphics controllers is increased from zero). Further, in one embodiment, switching does not require the termination (or restart) of the application processes that were using the virtual frame buffer in order to use the frame buffer that is associated with the graphics controller. The frame buffer that is associated with the graphics controller is under control of the graphics controller for generating display signals for driving a display device. The frame buffer under control of the graphics controller is typically in the video memory (graphics memory) on the video card (graphics card) that contains the graphics controller. However, it is understood that some graphics controller may use a portion of system memory (e.g., RAM memory) as the frame buffer.

Figure 8:
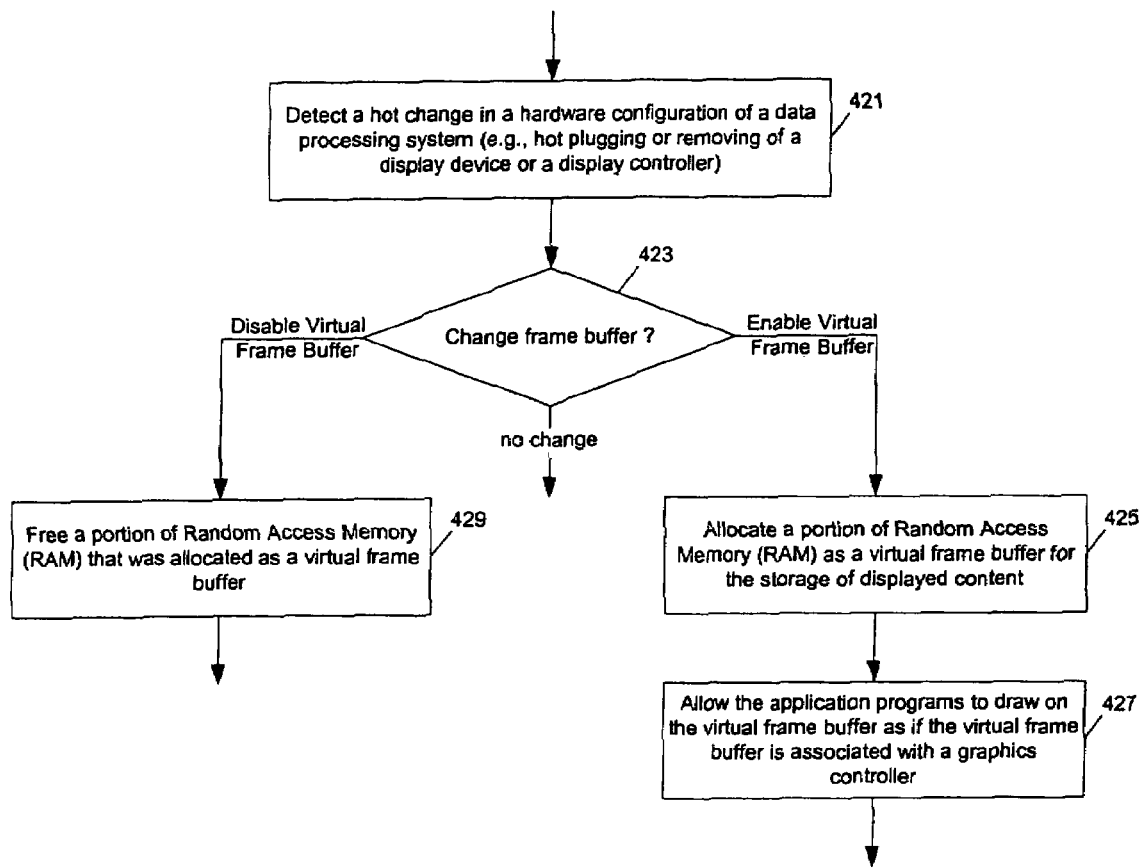
FIG. 8 shows a method to dynamically enable or disable the use of a virtual frame buffer according to one embodiment of the present invention.

FIG. 8 shows a method to dynamically enable or disable the use of a virtual frame buffer according to one embodiment of the present invention. Operation 421 detects a hot change in a hardware configuration of a data processing system (e.g., hot plugging or removing of a display device or a display controller). If operation 423 determines to disable a virtual frame buffer (e.g., when the number of active display devices that are directly attached to the system is increased from zero), operation 429 frees a portion of Random Access Memory (RAM) that was allocated as a virtual frame buffer. Further, one or more frame buffers that are under control of graphics controllers are used so that the contents of these frame buffers can be used by the corresponding graphics controllers to operate the active display devices. In one embodiment of the present invention, the virtual frame buffer is treated as a virtual screen that is not related to other screens; thus, when the virtual frame buffer is disabled, the application processes that were using the virtual frame buffer, if any, are informed the unavailability of the screen for drawing; and, no attempt is made by the operating system to replace the virtual frame buffer by another frame buffer. In one embodiment of the present invention, the system can have a number of virtual frame buffers as a number of virtual screens (e.g., for remote access by different remote users). For example, the start and the termination of the use of a virtual frame buffer can be associated with the network connection for remote access from a remote user. If operation 423 determines to enable a virtual frame buffer (e.g., when the number of active display devices that are directly attached to the system is decreased to zero), operation 425 allocates a portion of Random Access Memory (RAM) as a virtual frame buffer for the storage of displayed content; and, operation 427 allows the application programs to draw on the virtual frame buffer as if the virtual frame buffer is associated with a graphics controller. Further, in one embodiment of the present invention, a virtual frame buffer can be created as if a virtual screen (of a virtual display device) is attached to the system. Thus, a number of virtual frame buffers can be created and used for the drawing of user interfaces for different application programs (e.g., that are associated with different remote users). Thus, the operating systems may separate different remote users of a server with different virtual screens so that one user would not see the application programs that are intended for other users of the server; and each of the remote users sees a different virtual screen that corresponds to a different virtual frame buffer. Thus, a virtual frame buffer may be allocated or discarded in response to the status of remote access; and the operations on the virtual frame buffer may not be mapped to or mapped from the operations on a frame buffer that is under control of a graphics controller.

Figure 9:
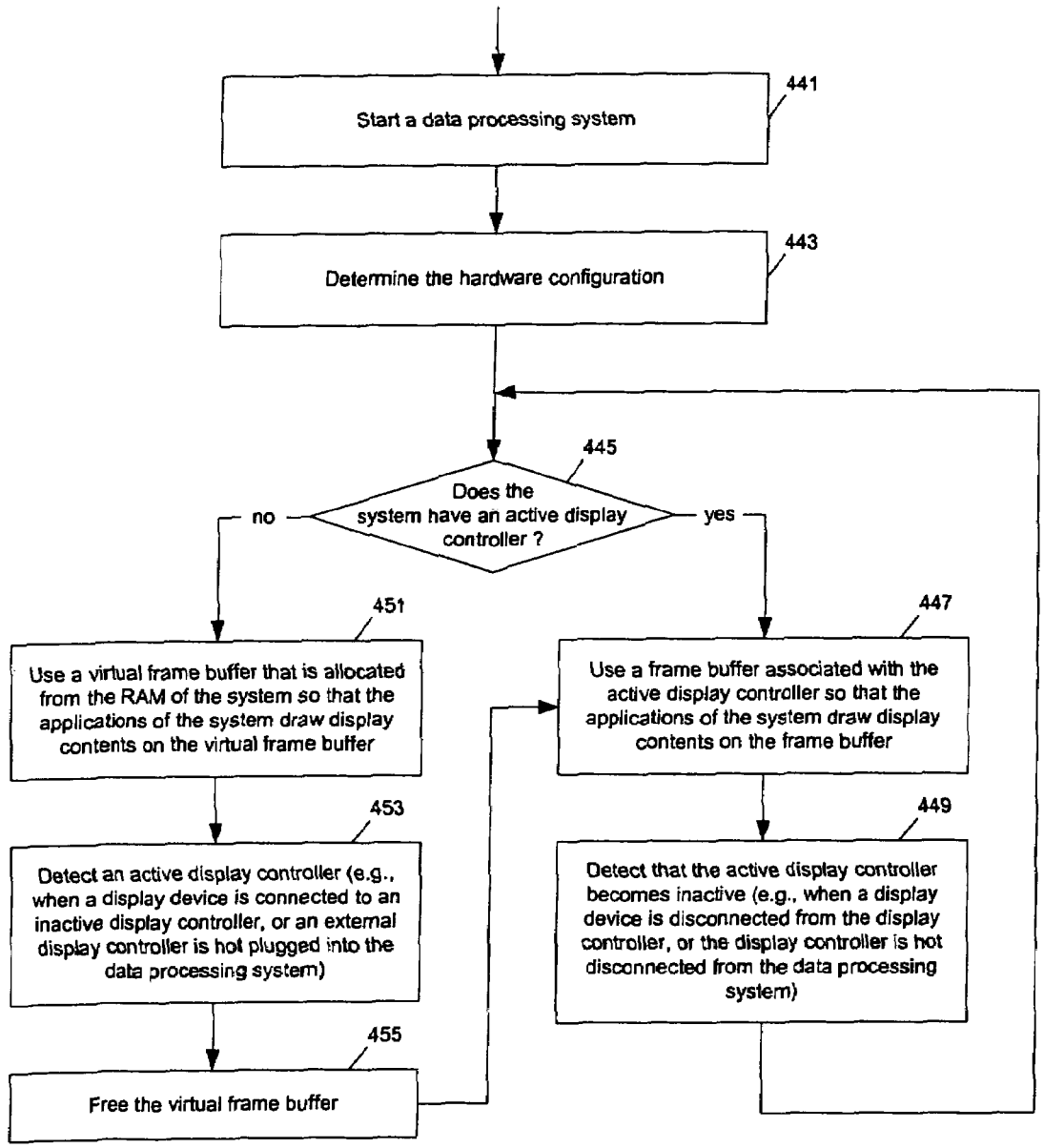
FIG. 9 shows a detailed method to manage the use of frame buffers according to one embodiment of the present invention.

FIG. 9 shows a detailed method to manage the use of frame buffers according to one embodiment of the present invention. After operation 441 starts a data processing system, operation 443 determines the hardware configuration. If operation 445 determines that the system has an active display controller (e.g., that actively controls a display device), operation 447 uses a frame buffer associated with the active display controller so that the applications of the system draw display contents on the frame buffer. If operation 449 detects that the active display controller becomes inactive (e.g., when a display device is disconnected from the display controller, or the display controller is hot disconnected from the data processing system), operation 445 is performed. This may include copying the data in the frame buffer of the to-be deactivated display controller to the virtual frame buffer's allocated RAM space (e.g., before the display controller is deactivated when the display device is disconnected from the display controller). If operation 445 determines that the system has no active display controller, operation 451 uses a virtual frame buffer that is allocated from the RAM of the system so that the applications of the system draw display contents on the virtual frame buffer. Thus, the system has at least one place for the application processes to draw their user interfaces. If operation 453 detects an active display controller (e.g., when a display device is connected to an inactive display controller, or an external display controller is hot plugged into the data processing system), operation 455 frees the virtual frame buffer (and, in one embodiment, copies the data in the virtual frame buffer to the frame buffer in the active display controller before freeing the virtual frame buffer); and, operation 447 is performed. Thus, the use of the virtual frame buffer guarantees that there is at least one frame buffer available for drawing, after the start up process of the system.

However, as described above, more than one virtual frame buffers can be used (e.g., for the different remote users). Thus, the use of some of the virtual frame buffers may not in connection with the display hardware configurations. For example, an virtual frame buffer can be created to serve a remote user when a network connection is established; the application processes running only for this remote user draw on this virtual frame buffer; and, after the remote access for this remote user terminates, the virtual frame buffer is freed and the corresponding application processes are terminated.

Although the operations in the above examples are illustrated in specific sequences, from this description, it will be appreciated that various different operation sequences and variations can be used without having to be limited to the above illustrated examples.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of display buffer management on a data processing system, the method comprising:
   detecting a hot connection of a display component into the data processing system, the hot connection causing enablement of a graphics module that includes a first frame buffer;
   determining a first determination to disable a virtual frame buffer in response to the hot connection, the virtual frame buffer being not controlled by any display controller of the data processing system, one or more application processes running on the data processing system drawing one or more user interfaces on the virtual frame buffer;
   copying, in response to the determining a first determination, at least a portion of contents of the one or more user interfaces in the virtual frame buffer to the first frame buffer; and
   disabling the virtual frame buffer in response to the first determination;
   wherein, after the virtual frame buffer is disabled, the one or more application processes continue, without suspension, to draw the one or more user interfaces on the first frame buffer under control of a display controller, without a graphical user interface system of the data processing system being restarted.

2. A method as in claim 1, wherein the virtual frame buffer comprises memory allocated from random access memory of the data processing system.

3. A method as in claim 2, wherein said disabling further comprises:
   freeing the memory allocated from the random access memory of the data processing system.

4. A method as in claim 1, wherein the display component comprises the display controller.

5. A method as in claim 4, further comprising:
   activating the first frame buffer under control of the display controller.

6. A method as in claim 1, wherein the display component comprises a display device, which is controlled by the display controller after the hot plug-in.

7. A method as in claim 6, further comprising:
   activating the display controller in response to the hot plug-in; and
   activating the first frame buffer.

8. A method as in claim 1, wherein the hot plug-in comprises turning on a power supply to the display component which has an established wire connection between the display component and the data processing system.

9. A method as in claim 1, wherein the hot plug-in comprises establishing a wire connection between the display component and the data processing system while both the display component and the data processing system are energized with power.

10. A method of frame buffer management on a data processing system, the method comprising:

enabling a first frame buffer on the data processing system, a first application process drawing a first user interface on the first frame buffer;

enabling a virtual frame buffer on the data processing system without terminating the first application process, a second application process drawing a second user interface on the virtual frame buffer, the virtual frame buffer being not controlled by any display controller of the data processing system; and concurrently executing the first and second application processes in one processor of the data processing system, wherein the first application process draws the first user interface on the first frame buffer and second application process draw the second user interfaces to the virtual frame buffers during the concurrent execution.

11. A method as in claim 10, wherein the first frame buffer is a virtual frame buffer which is not under control of any display controller of the data processing system.

12. A method as in claim 10, wherein the first frame buffer is under control of a display controller of the data processing system.

13. A method as in claim 12, further comprising:
disabling the first frame buffer;
wherein the first application process continues to draw the first user interface on the virtual frame buffer after said enabling the virtual frame buffer and after said disabling the first frame buffer.

14. A method as in claim 13, wherein said disabling the first frame butler is in response to a deactivation of the display controller.

15. A method as in claim 14, wherein the deactivation of the display controller is in response to a deactivation of a display device controlled by the display controller.

16. A method as in claim 14, further comprising:
enabling the first frame buffer in response to an activation of the display controller after said disabling the first frame buffer.

17. A method as in claim 16, further comprising:
disabling the virtual frame buffer without terminating the second application process;
wherein the second application process continues to draw the second user interface on the first frame buffer after said disabling the virtual frame buffer.

18. A method as in claim 10, wherein the first application process continues to draw the first user interface on the first frame buffer after said enabling the virtual frame buffer.

19. A method as in claim 10, further comprising:
providing contents on the virtual frame buffer through a network for remote access.

20. A method as in claim 19, further comprising:
disabling the virtual frame buffer upon a termination of the remote access.

21. A machine readable storage medium containing executable computer program instructions which when executed by a data processing system cause said system to perform a method of display buffer management on the data processing system, the method comprising:
detecting a hot connection of a display component into the data processing system, the hot connection causing enablement of a graphics module that includes a first frame buffer;
determining a first determination to disable a virtual frame buffer in response to the hot connection, the virtual frame buffer being not controlled by any display controller of the data processing system, one or more application processes running on the data processing system drawing one or more user interfaces on the virtual frame buffer;

copying, in response to the determining a first determination, at least a portion of contents of the one or more user interfaces in the virtual frame buffer to the first frame buffer; and disabling the virtual frame buffer in response to the first determination;

wherein, after the virtual frame buffer is disabled, the one or more application processes continue, without suspension, to draw the one or more user interfaces on the first frame buffer under control of a display controller, without a graphical user interface system of the data processing system being restarted.

22. A medium as in claim 21, wherein the virtual frame buffer comprises memory allocated from random access memory of the data processing system.

23. A medium as in claim 22, wherein said disabling further comprises:
freeing the memory allocated from the random access memory of the data processing system.

24. A medium as in claim 23, wherein the display component comprises the display controller.

25. A medium as in claim 24, wherein the method further comprises:
activating the first frame butter under control of the display controller.

26. A medium as in claim 21, wherein the display component comprises a display device, which is controlled by the display controller after the hot plug-in.

27. A medium as in claim 26, wherein the method further comprises:
activating the display controller in response to the hot plug-in; and
activating the first frame buffer.

28. A medium as in claim 21, wherein the hot plug-in comprises turning on a power supply to the display component which has an established wire connection between the display component and the data processing system.

29. A medium as in claim 21, wherein the hot plug-in comprises establishing a wire connection between the display component and the data processing system while both the display component and the data processing system are energized with power.

30. A machine readable storage medium containing executable computer program instructions which when executed by a data processing system cause said system to perform a method of frame buffer management on the data processing system, the method comprising:
enabling a first frame buffer on the data processing system, a first application process drawing a first user interface on the first frame buffer;
enabling a virtual frame buffer on the data processing system without terminating the first application process, a second application process drawing a second user interface on the virtual frame buffer, the virtual frame buffer being not controlled by any display controller of the data processing system; and
concurrently executing the first and second application processes in one processor of the data processing system, wherein the first application process draws the first user interface on the first frame buffer and second application processes draw the second user interfaces to the virtual frame buffers during the concurrent execution.

31. A medium as in claim 30, wherein the first frame buffer is a virtual frame buffer which is not under control of any display controller of the data processing system.

32. A medium as in claim 30, wherein the first frame buffer is under control of a display controller of the data processing system.

33. A medium as in claim 32, wherein the method further comprises:
disabling the first frame buffer;
wherein the first application process continues to draw the first user interface on the virtual frame buffer after said enabling the virtual frame buffer and after said disabling the first frame buffer.

34. A medium as in claim 33, wherein said disabling the first frame buffer is in response to a deactivation of the display controller.

35. A medium as in claim 34, wherein the deactivation of the display controller is in response to a deactivation of a display device controlled by the display controller.

36. A medium as in claim 34, wherein the method further comprises:
enabling the first frame buffer in response to an activation of the display controller after said disabling the first frame buffer.

37. A medium as in claim 36, wherein the method further comprises:
disabling the virtual frame buffer without terminating the second application process;
wherein the second application process continues to draw the second user interface on the first frame buffer after said disabling the virtual frame buffer.

38. A medium as in claim 30, wherein the first application process continues to draw the first user interface on the first frame buffer after said enabling the virtual frame buffer.

39. A medium as in claim 30, wherein the method further comprises:
providing contents on the virtual frame buffer through a network for remote access.

40. A medium as in claim 30, wherein the method further comprises: disabling the virtual frame buffer upon a termination of the remote access.

41. A data processing system for display buffer management, the data processing system comprising:
means for detecting a hot connection of a display component into the data processing system, the hot connection causing enablement of a graphics module that includes a first frame buffer;
means for determining a first determination to disable a virtual frame buffer, the virtual frame buffer being not controlled by any display controller of the data processing system, one or more application processes running on the data processing system drawing one or more user interfaces on the virtual frame buffer;
means for copying, in response to the determining a first determination, at least a portion of contents of the one or more user interfaces in the virtual frame buffer to the first frame buffer; and
means for disabling the virtual frame buffer in response to the first determination;
wherein, after the virtual frame buffer is disabled, the one or more application processes draw the one or more user interfaces on a first frame buffer under control of a display controller, without a graphical user interface system of the data processing system being restarted.

42. A data processing system as in claim 41, wherein the virtual frame buffer comprises memory allocated from random access memory of the data processing system.

43. A data processing system as in claim 42, wherein said means for disabling further comprises:
means for freeing the memory allocated from the random access memory of the data processing system.

44. A data processing system as in claim 41, wherein the display component comprises the display controller.

45. A data processing system as in claim 44, further comprising:
means for activating the first frame buffer under control of the display controller.

46. A data processing system as in claim 41, wherein the display component comprises a display device, which is controlled by the display controller after the hot plug-in.

47. A data processing system as in claim 46, further comprising:
means for activating the display controller in response to the hot plug-in; and
means for activating the first frame buffer.

48. A data processing system as in claim 41, wherein the hot plug-in comprises turning on a power supply to the display component which has an established wire connection between the display component and the data processing system.

49. A data processing system as in claim 41, wherein the hot plug-in comprises establishing a wire connection between the display component and the data processing system while both the display component and the data processing system are energized with power.

50. A data processing system of frame buffer management, the data processing system comprising:
means for enabling a first frame buffer on the data processing system, a first application process drawing a first user interface on the first frame buffer;
means for enabling a virtual frame buffer on the data processing system without terminating the first application process, a second application process drawing a second user interface on the virtual frame buffer, the virtual frame buffer being not controlled by any display controller of the data processing system; and
means for concurrently executing the first and second application processes in one processor of the data processing system, wherein the first application process draws the first user interface on the first frame buffer and second application processes draw the respective second interfaces to the virtual frame buffers during the concurrent execution.

51. A data processing system as in claim 50, wherein the first frame buffer is a virtual frame buffer which is not under control of any display controller of the data processing system.

52. A data processing system as in claim 50, wherein the first frame buffer is under control of a display controller of the data processing system.

53. A data processing system as in claim 52, further comprising:
means for disabling the first frame buffer;
wherein the first application process continues to draw the first user interface on the virtual frame buffer after the virtual frame buffer is enabled and after the first frame buffer is disabled.

54. A data processing system as in claim 53, wherein the first frame buffer is disabled in response to a deactivation of the display controller.

55. A data processing system as in claim 54, wherein the deactivation of the display controller is in response to a deactivation of a display device controlled by the display controller.

56. A data processing system as in claim 54, further comprising:
   means for enabling the first frame buffer in response to an activation of the display controller after the first frame buffer is disabled.

57. A data processing system as in claim 56, further comprising:
   means for disabling the virtual frame buffer without terminating the second application process;
   wherein the second application process continues to draw the second user interface on the first frame buffer after the virtual frame buffer is disabled.

58. A data processing system as in claim 50, wherein the first application process continues to draw the first user interface on the first frame buffer after the virtual frame buffer is enabled.

59. A data processing system as in claim 50, further comprising:
   means for providing contents on the virtual frame buffer through a network for remote access.

60. A data processing system as in claim 59, further comprising:
   means for disabling the virtual frame butler upon a termination of the remote access.

\* \* \* \* \*

UNITED STATES PATENT AND TRADEMARK OFFICE
CERTIFICATE OF CORRECTION

| | | |
|---|---|---|
| PATENT NO. | : 7,657,686 B2 | Page 1 of 1 |
| APPLICATION NO. | : 11/644154 | |
| DATED | : February 2, 2010 | |
| INVENTOR(S) | : Michael James Paquette et al. | |

It is certified that error appears in the above-identified patent and that said Letters Patent is hereby corrected as shown below:

In column 11, line 60, delete "an" and insert -- a --, therefor.

In column 13, line 13, in Claim 10, delete "second" and insert -- the second --, therefor.

In column 13, line 14, in Claim 10, delete "draw" and insert -- draws --, therefor.

In column 13, line 14, in Claim 10, delete "interfaces" and insert -- interface --, therefor.

In column 13, line 15, in Claim 10, delete "buffers" and insert -- buffer --, therefor.

In column 13, line 30, in Claim 14, delete "butler" and insert -- buffer --, therefor.

In column 14, line 24, in Claim 24, delete "23," and insert -- 21, --, therefor.

In column 14, line 28, in Claim 25, delete "butter" and insert -- buffer --, therefor.

In column 14, line 66, in Claim 30, delete "interfaces" and insert -- interface --, therefor.

In column 14, line 67, in Claim 30, delete "buffers" and insert -- buffer --, therefor.

In column 16, line 45, in Claim 50, delete "interfaces" and insert -- interface --, therefor.

In column 16, line 45, in Claim 50, delete "buffers" and insert -- buffer --, therefor.

In column 18, line 11, In Claim 60, delete "butler" and insert -- buffer --, therefor.

Signed and Sealed this
Eleventh Day of October, 2011

David J. Kappos
*Director of the United States Patent and Trademark Office*